(12) United States Patent
Al-Araji et al.

(10) Patent No.: US 6,567,118 B1
(45) Date of Patent: May 20, 2003

(54) FREQUENCY AGILE ADAPTIVE AUTOMATIC GAIN CONTROL CIRCUIT

(75) Inventors: Saleh Al-Araji, Alpharetta, GA (US); Paul Quesenberry, Marietta, GA (US); Dale Patterson, Dacula, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 324 days.

(21) Appl. No.: 09/698,746

(22) Filed: Oct. 27, 2000

(51) Int. Cl.[7] .................. H04N 17/00; H04N 7/16; H04N 9/74
(52) U.S. Cl. ................ 348/180; 455/245.1; 455/237.1; 725/149; 375/345; 348/678
(58) Field of Search ................. 348/180, 678, 348/189, 192, 707; 725/131, 149, 127, 128; 455/67.1, 67.3, 234.1, 237.1, 245.1, 245.2, 250.1; 330/2, 143; 375/345, 224

(56) References Cited

U.S. PATENT DOCUMENTS

| | | | |
|---|---|---|---|
| 4,827,511 A | 5/1989 | Masuko | 380/15 |
| 5,235,424 A | 8/1993 | Wagner et al. | 358/174 |
| 5,784,413 A * | 7/1998 | Chen | 375/308 |
| 5,835,850 A * | 11/1998 | Kumar | 455/67.4 |
| 5,896,414 A * | 4/1999 | Meyer et al. | 375/222 |
| 5,930,231 A * | 7/1999 | Miller et al. | 370/210 |
| 6,014,407 A * | 1/2000 | Hunsinger et al. | 375/206 |
| 6,046,781 A * | 4/2000 | LeRoy | 348/731 |
| 6,054,896 A * | 4/2000 | Wright et al. | 330/149 |
| 6,091,441 A | 7/2000 | Al-Araji et al. | 348/6 |
| 6,166,598 A * | 12/2000 | Schlueter | 330/127 |
| 6,470,055 B1 * | 10/2002 | Feher | 375/259 |
| 6,512,555 B1 * | 1/2003 | Patel et al. | 348/726 |

FOREIGN PATENT DOCUMENTS

| | | |
|---|---|---|
| EP | 0495141 | 7/1992 |
| WO | WO 97/47093 | 12/1997 |

* cited by examiner

Primary Examiner—Victor R. Kostak
(74) Attorney, Agent, or Firm—Kenneth M. Massaroni; Hubert J. Barnhardt, III; Shelley L. Couturier

(57) ABSTRACT

An amplifier (125) includes at least one gain stage (210) for amplifying a signal received by the amplifier (125). The amplifier (125) also includes an AGC circuit (400, 500) that adjusts the amplification of the gain stage (210). The AGC circuit (400, 500) determines whether the input signal to the amplifier (125) is a digital signal or an analog signal and transforms either signal into the frequency domain, thereby automatically adjusts the processing method depending upon the type of pilot carrier signal. The AGC circuit (400, 500) also possesses the ability to process a change in the frequency of a pilot carrier signal remotely.

16 Claims, 6 Drawing Sheets

FREQUENCY AGILE ADAPTIVE AUTOMATIC GAIN CONTROL CIRCUIT

FIELD OF THE INVENTION

This invention relates generally to broadband communications, such as cable television systems, and more specifically to automatic gain control (AGC) circuits.

BACKGROUND OF THE INVENTION

A communication system 100, such as a two-way cable television system, is depicted in FIG. 1. The communication system 100 includes headend equipment 105 for generating forward signals that are transmitted in the downstream direction along a communication medium, such as a fiber optic cable 110, to an optical node 115 that converts optical signals to radio frequency (RF) signals. The RF signals are further transmitted along another communication medium, such as coaxial cable 120, and are amplified, as necessary, by one or more distribution amplifiers 125 positioned along the communication medium. Taps 130 included in the cable television system split off portions of the forward signals for provision to subscriber equipment 135, such as set top terminals, computers, and televisions. In a two-way system, the subscriber equipment 135 can also generate reverse signals that are transmitted upstream, amplified by any distribution amplifiers 125, converted to optical signals, and provided to the headend equipment 105.

Communication systems, as depicted in FIG. 1, often include amplifiers to boost signal levels, and automatic gain control (AGC) circuits within the amplifier are typically used to monitor and control the gain of such amplifiers.

FIG. 2 is an electrical block diagram of a conventional amplifier 125 that includes an AGC circuit. In operation, the amplifier 125 receives a forward signal from the downstream path at an input port 205. In conventional cable television systems, the forward signals have been predominately transmitted over analog channels. The forward signal is transmitted through one or more gain stages 210 for amplifying the forward signal. The amplified signal is then transmitted through a Bode circuit 215 that varies the signal level by attenuation. A final output gain stage 220 subsequently processes the forward signal, which is then transmitted to an output port 225. The output of the final gain stage 220 is also coupled to an AGC circuit 230 that is used to further control the attenuation of the Bode circuit 215 in response to the signal level of the amplified forward signal.

FIG. 3 is an electrical block diagram of the conventional AGC circuit 230 of FIG. 2. The AGC circuit 230 includes an input port for receiving the forward signal, which is also coupled to the amplifier output 225 of the final gain stage 220. The AGC circuit 230 includes a band pass filter 305 and a gain stage 310 for filtering and amplifying, respectively, the pilot signal. The filtered signal is then transmitted to an AM detector 3 15 that demodulates the signal to recover an analog video signal. Next, the demodulated analog video signal is amplified through a video amplifier 320.

A video peak detector 325 then samples the horizontal synchronization pulses of the demodulated video signal in order to establish a DC voltage that represents the peak carrier level. The peak detector 325 monitors the DC voltage of the horizontal synchronization pulses of the demodulated video signal to set and hold peak voltage values and to generate a peak voltage signal representative of the peak voltage values. This can be done, for example, by storing the DC voltage values in a capacitor-resistor network between synchronization pulses.

The DC voltage signal provided by the peak detector 325 is compared with a thermal reference level by the integrator 330 to verify that the gain of the amplifier gain stages has remained constant. If the compared peak voltage signal has dropped below or risen above the predetermined thermal reference level, a thermal reference voltage signal from the reference voltage circuit 335 will be provided at the output of the AGC circuit 230 until such time as the voltage level of the pilot carrier signal level again equals the reference voltage level.

Again referring to the forward input signal to the AGC circuit 230, the input signal is filtered through the band pass filter 305 to allow a predetermined pilot carrier signal to pass. The pilot carrier signal is then demodulated and used, through comparison with the reference voltage level, to control the Bode circuit 215 (FIG. 2). The frequency of the pilot carrier signal is generally determined by selecting a median point between the lowest channel and the highest channel in the forward frequency spectrum, although the frequency of the pilot carrier may vary as long as the band pass filter 305 and other device components are configured to process a carrier signal of the desired frequency.

Historically, cable television systems have transmitted only analog signals, so transmission and processing of an analog pilot carrier signal by conventional analog AGC circuits has worked well. The cable television industry, however, is migrating to transmission of digital signals, so a pilot carrier signal in the digital frequency spectrum may, in the future, be chosen for processing through the AGC circuit. These digital signals are generally QAM modulated, and QAM modulated digital signals cannot be accurately processed by prior art AGC circuits, such as the AGC circuit 230 shown in FIG. 3. More specifically, the DC voltage values of the QAM modulated signals include complex, multi-level data having peak values at varying times and different rates, so peak detection in a conventional AGC circuit does not provide useful or accurate information.

In addition to the potential problem that the pilot carrier signal may be within the digital frequency spectrum, another problem is that cable operators may choose to change the frequency of the pilot carrier signal after field installation. More specifically, after the network 100 has been installed and is servicing subscribers through use of a particular pilot carrier frequency, channel frequencies may change; for example, the cable operators may want to bundle channels into different packages that may require some cable television channels to change in the frequency spectrum. Consequently, the frequency required for a new channel may be the same frequency as the pilot carrier frequency. Additionally, the operator may have ordered an incorrect pilot carrier frequency and installed the units before the error is realized. In order to change a preset pilot carrier frequency to a different frequency, the operator must locate each piece of equipment that includes an AGC circuit and physically replace it with an AGC circuit having a different pilot signal frequency. Replacing this amount of circuitry can be, however, extremely time consuming and expensive.

Thus, what is needed is an AGC circuit that has the agility and flexibility to tune and process numerous pilot carrier signals in either the analog or digital frequency spectrum.

DETAILED DESCRIPTION OF A PREFERRED EMBODIMENT

As briefly mentioned in the Background of the Invention, communication systems often include amplifiers for boosting signal levels as signals are transmitted to remote subscribers. These amplifiers typically include automatic gain control (AGC) circuits for controlling signal levels, but conventional AGC circuits are not suitable for use with both analog and digital pilot signals. In addition, the pilot signals are not easily changed without incurring great costs once circuitry for processing the preset pilot signals has been installed in the field. Instead, conventional AGC circuits are limited to processing analog input signals with one specific frequency for the pilot signal. With cable television systems changing very rapidly and migrating to a digital format, the amplifiers used in these systems require an alternative AGC circuit to monitor and control the amplifier gain by flexibly processing pilot signals of different frequencies in addition to processing both analog and digital pilot signals.

Figure 1:
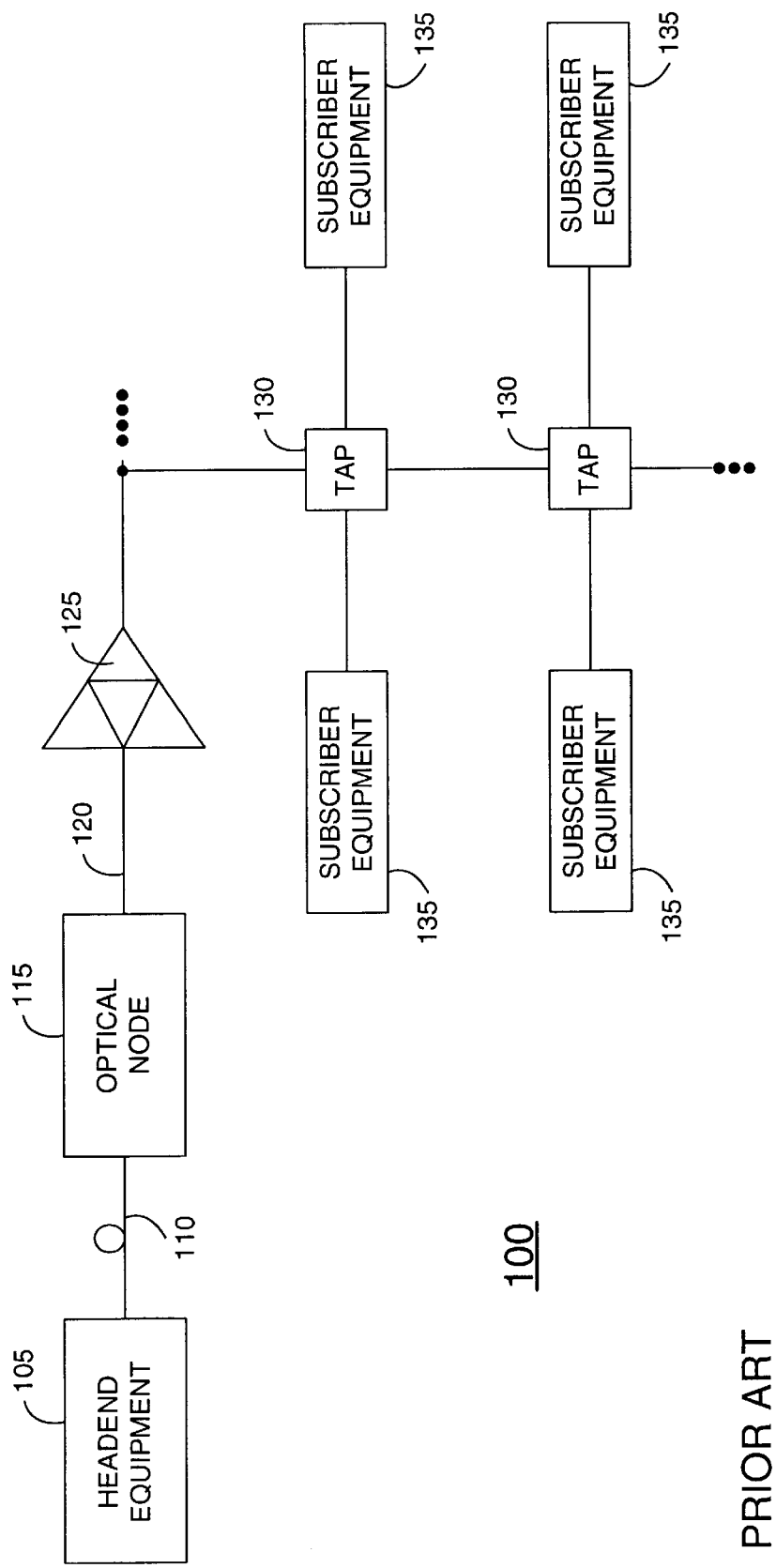
FIG. 1 is a block diagram of a conventional communication system, such as a cable television system.
Figure 2:
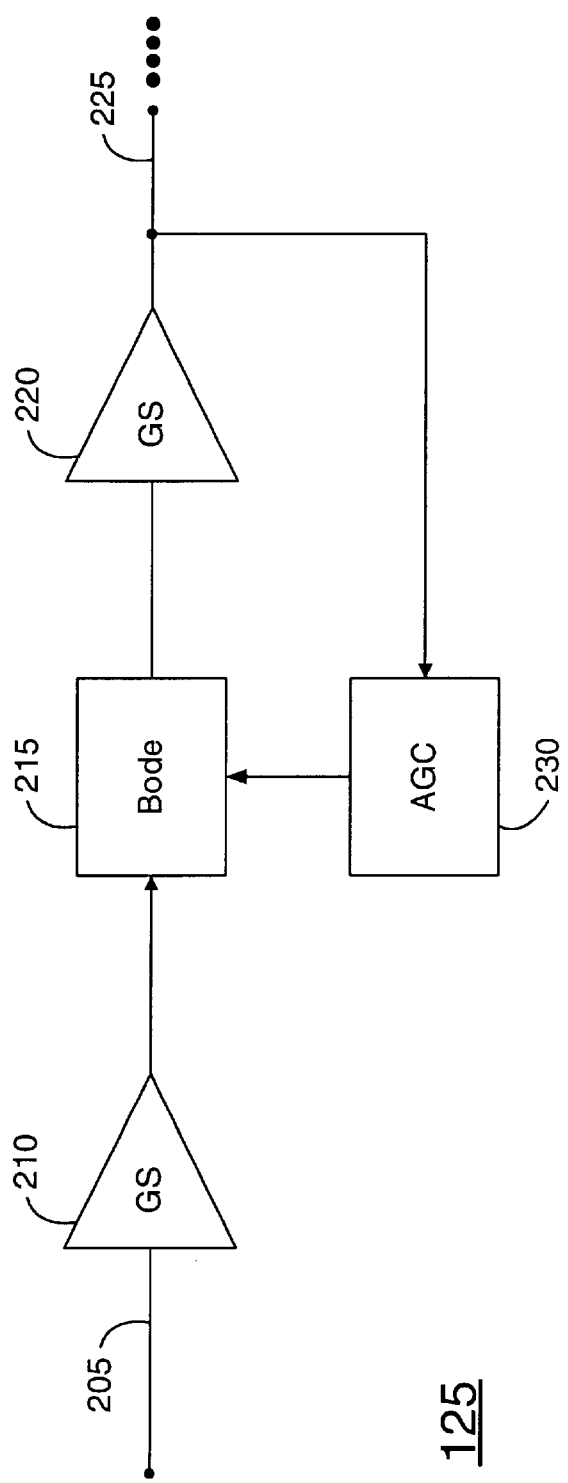
FIG. 2 is a block diagram of a conventional amplifier included in the communication system of FIG. 1.
Figure 3:
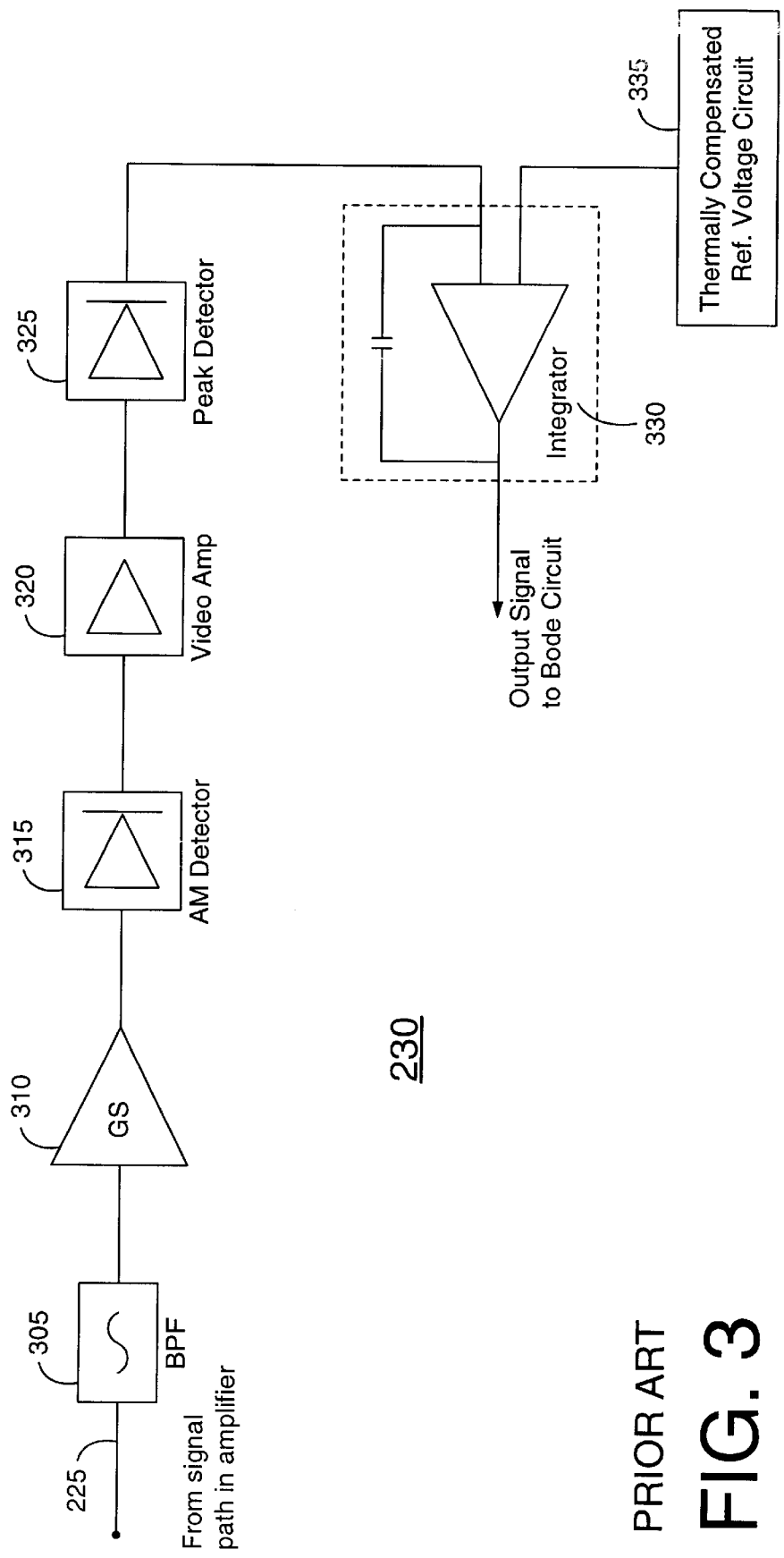
FIG. 3 is a block diagram of the conventional automatic gain control (AGC) circuit included in the amplifier of FIG. 2.
Figure 4:
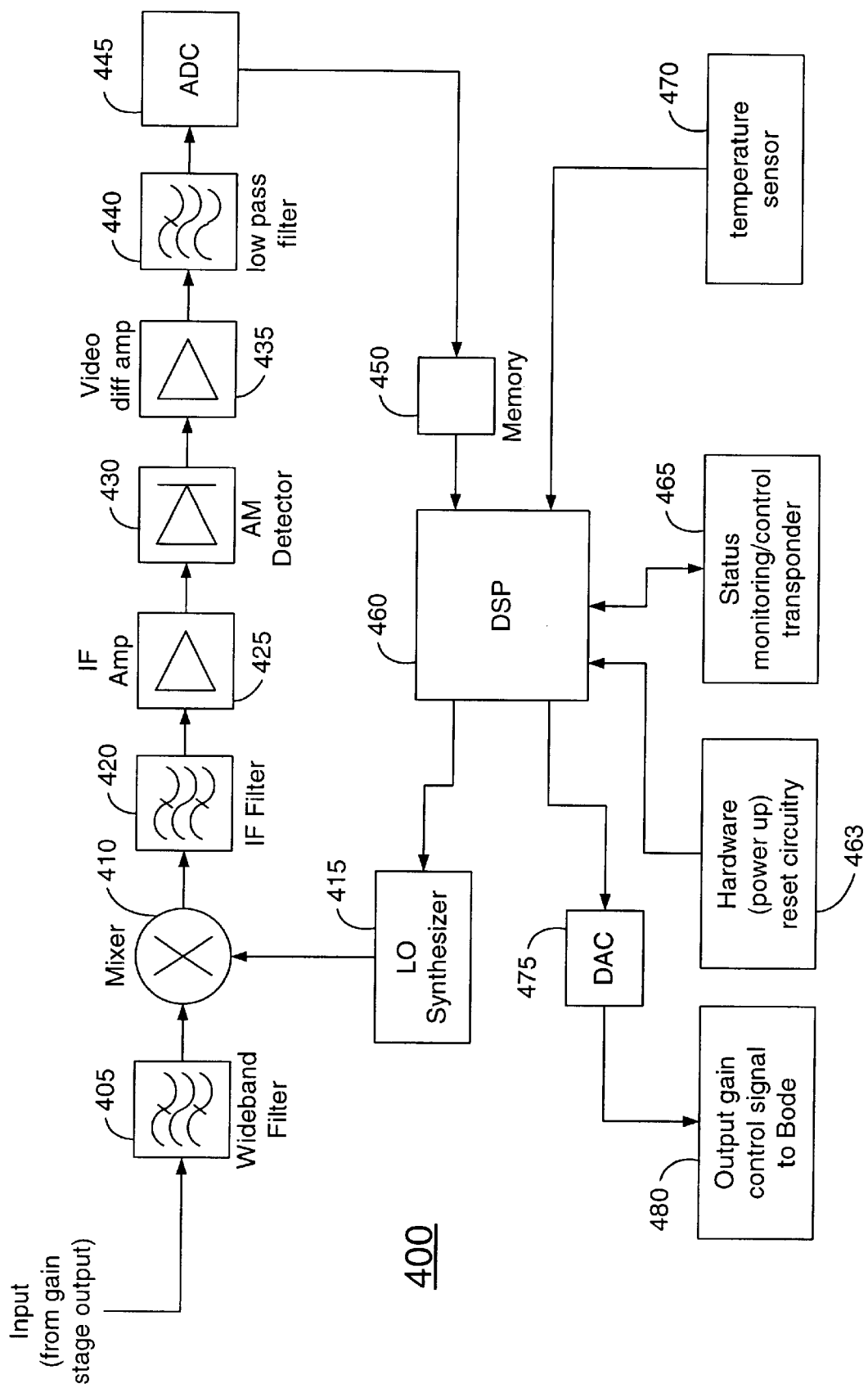
FIG. 4 is a bock diagram of a first embodiment of a frequency agile AGC circuit in accordance with the present invention.

An advantage of the present invention is that a frequency agile AGC circuit 400, which is depicted in FIG. 4, is provided to discriminate between an analog signal and a digital signal, and to use either for controlling gain levels within an amplifier. More importantly, however, the AGC circuit 400 as shown is frequency agile. Specifically, the pilot channel frequency can be changed remotely via status monitoring software that is located at the headend.

Briefly, status monitoring can be included in the communication system to verify different signal levels within electrical devices, for example, by monitoring power supply current and voltage levels and providing control thereof, or to detect any functional faults that have occurred in the device and relay that information back to the headend equipment. In typical status monitoring systems, software is configured in a workstation that is part of the headend equipment. The software sends signals, or controls, to the transponders and receives signals, or responses, from the transponders that are usually installed in several electrical devices, such as the amplifiers. The status monitoring software can, in accordance with the present invention, control the frequency, level, and tilt of the pilot channel. By way of example, if the pilot channel is currently at 445.25 MHz, all the AGC circuits within the network can be changed remotely to process a new frequency, such as 547.25 MHz. These advantages ultimately allow the operator flexibility in the design of its network, and such flexibility has not been available in conventional AGC circuits.

Referring to FIG. 4, an AGC circuit 400 in accordance with a preferred embodiment of the present invention includes an input port that receives a forward input signal from the output of the gain stage of an amplifier. The forward input signal is transmitted through a wideband filter 405, which filters the input signal, thereby allowing a much greater frequency band through the filter than do conventional AGC bandpass filters. The use of the wideband filter 405 increases the flexibility of the system by permitting a system operator to choose, and the AGC circuit 400 to process, a wider range of frequency values for the carrier signal. The filtered signals then pass through to a mixer 410. Functionally, the mixer 410 combines all the filtered signals with a signal from a local oscillator (LO) synthesizer 415. The LO synthesizer 415 and the mixer 410 can, for example, be viewed as an intermediate frequency (IF) television tuner. The LO synthesizer 415 has the capability of providing a dynamic value, and the output value depends upon the pilot carrier signal, as will be discussed further below. The output of the LO synthesizer 415 is combined with the filtered signals in the mixer 410 to tune to the pilot carrier signal, and the mixer output is then provided to an intermediate filter (IF) filter 420.

If, for instance, the pilot carrier signal is changed in its frequency, the LO synthesizer dynamic value is adjusted to accommodate the change in frequency. The IF filter 420, however, remains centered at a fixed-value frequency and processes the pilot carrier signal regardless of the frequency selected for the pilot carrier signal. The signal is then amplified by an IF amplifier 425. The carrier signal is normally AM modulated by an analog or digital video signal which can be recovered using an AM detector 430, then the demodulated video signal is amplified by a video amplifier 435. A low pass filter 440 is used to filter the video signal, and the filter 440 has a cut off frequency that is generally twice the video bandwidth, which is typically 6 MHz. The filtered video signal is digitized through an analog-to-digital (A/D) converter 445, and the digitized video signal is stored in memory 450 and provided to a digital signal processor (DSP) 460. The DSP 460 will be discussed further below.

Figure 5:
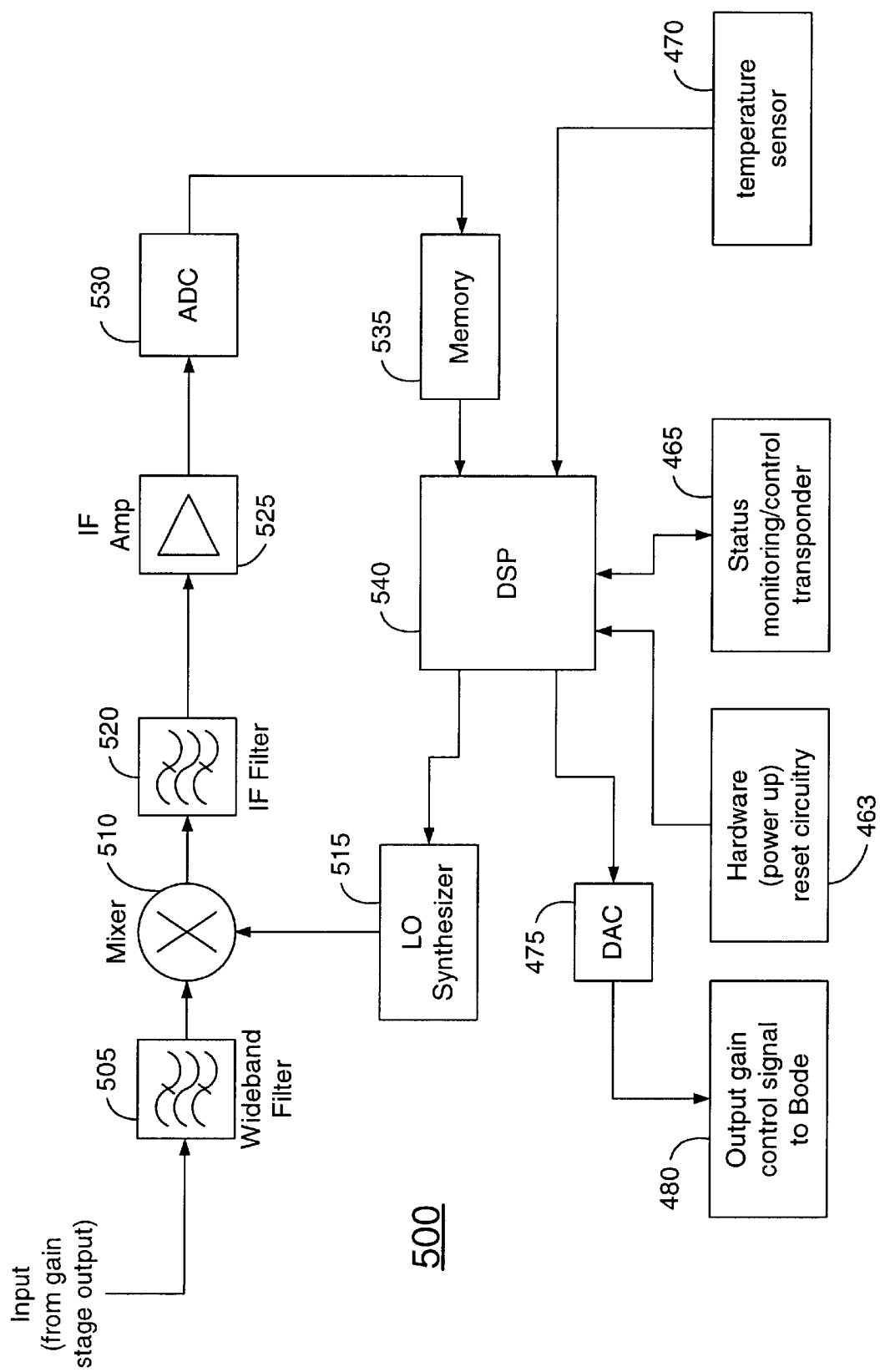
FIG. 5 is a block diagram of a second embodiment of a frequency agile AGC circuit in accordance with the present invention.

A second embodiment of an AGC circuit 500 in accordance with the present invention is depicted in FIG. 5. In this embodiment, the AM detector 430, the video amplifier 435, and the low pass filter 440 of FIG. 4 are eliminated. The AGC circuit 500 includes an input port that receives the forward input signal from the output of the gain stage of an amplifier. The forward input signal is transmitted through a wideband filter 505, which filters the input signal and allows a much wider frequency band through the filter than do conventional AGC bandpass filters. As a result, a wide range of frequency values for the carrier signal can be chosen. The filtered signals then pass through to a mixer 510. Functionally, the mixer 510 combines all the filtered signals with a signal from the local oscillator (LO) synthesizer 515. As in the first embodiment, the LO synthesizer 515 has the capability of providing a dynamic value that is dependent upon the pilot carrier signal, as will be discussed further below.

The output of the mixer 510 is further filtered through a fixed-value IF filter 520 to provide channel immunity within the circuit. The signal is then amplified by an IF amplifier 525. As in the previous embodiment shown in FIG. 4, the carrier signal is normally AM modulated by an analog or digital video signal which can be recovered using an AM detector 530; however, since the video bandwidth is generally 6 MHz, the frequency bandwidth is sufficiently narrow to permit under-sampling of the video signal using just the A/D converter 530. As a result, performance of the AGC circuit 500 is equivalent to that of AGC circuit 400 (FIG. 4). The digitized video signal is then stored in memory 535 and provided to a digital signal processor (DSP) 540.

The digital signal processor 460, 540 transforms the received video signal into the frequency domain and determines whether the signal is digital or analog. The transformed signal is determined to be analog when the signal has a dominant component at the frequency of the horizontal synchronization signal. On the other hand, when the signal has no dominant components, i.e., when the frequency domain is relatively flat, the transformed signal is determined to be digital. The video signals are then normalized and compared with a thermal reference for determining the amount of control that is necessary for the Bode. The DSP 460, 540 is also capable of processing a pilot carrier signal of any frequency that is programmed in by a remote operator. In other words, the frequency of the pilot carrier signal can be changed in the software at the headend, and all electrical devices that include AGC circuits 400, 500 of the present invention are then programmed to process a different pilot carrier signal than originally entered.

Figure 6:
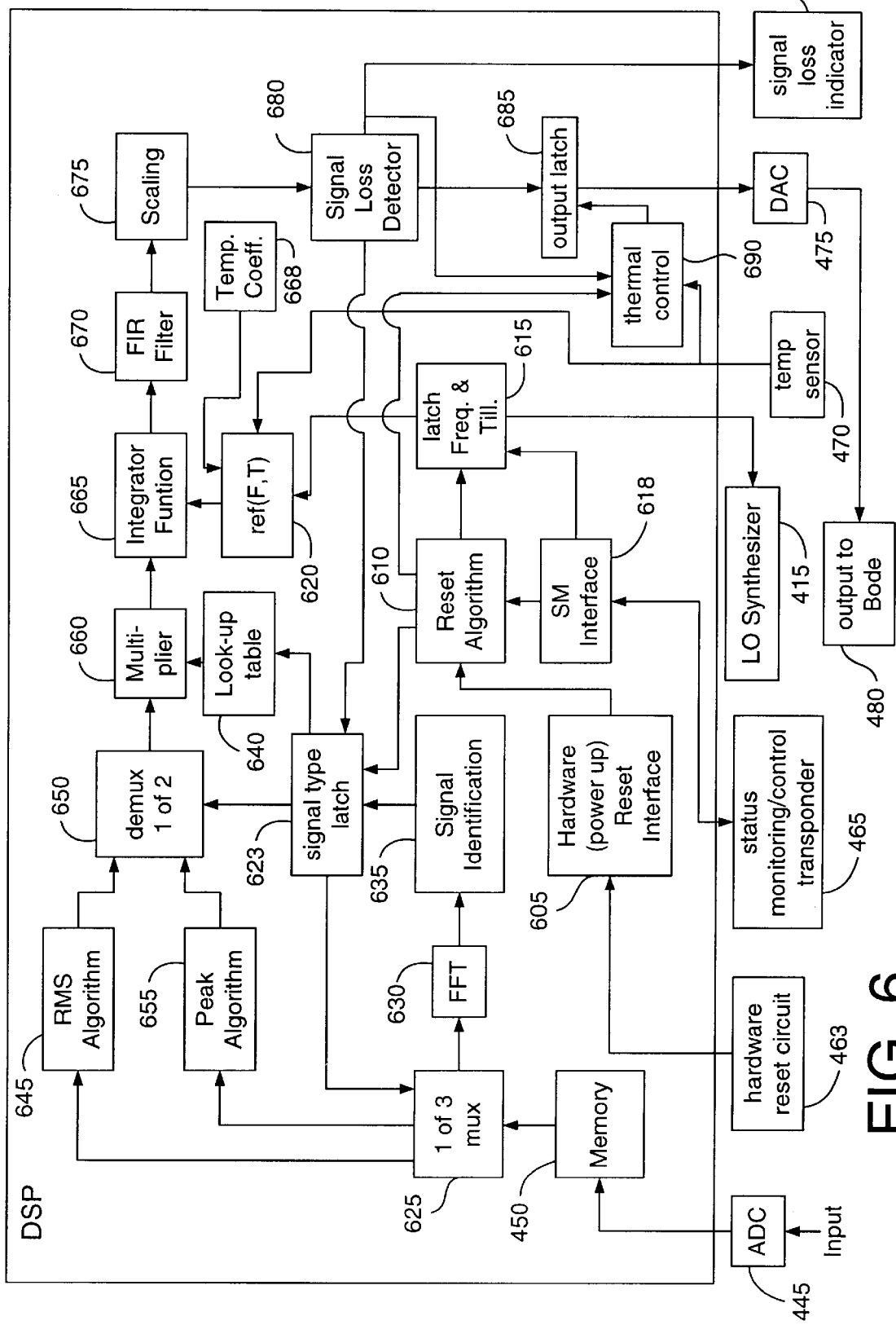
FIG. 6 is a block diagram of a digital signal processor included within the first and second embodiments of the present invention.

More specifically, referring to the block diagram of the DSP in FIG. 6, in conjunction with FIGS. 4 and 5, the DSP 460, 540 is initially powered up by a hardware-reset circuit 463. The circuit 463 sends a signal to a hardware-reset interface 605 that resets the algorithm element 610 to begin processing and enable a frequency and tilt latch element 615. The frequency and tilt of the carrier signal are provided by a status monitor (SM) interface 618 to the frequency and tilt latch 615. The frequency latch 615, which represents the dynamic value, is then provided to the LO synthesizer 415, 515. The dynamic value is controlled via the SM interface 618, which receives a value from a status monitoring transponder 465 (FIGS. 4 and 5). The SM interface 618 may also issue a reset to the reset algorithm 610, if necessary, to reset parameters that may be changed in the system.

In practice, an operator programs the frequency of the desired pilot carrier signal into the software at the headend, which sends the signal to a transponder, such as transponders 465, in the field. The SM interface 618 receives the desired frequency. The frequency of the pilot carrier signal is then provided to the LO synthesizer 450, 515, which adjusts the frequency to ensure that the IF filter 420, 520 is centered at the fixed-value frequency that is designed in the IF filter 420, 520 (FIGS. 4 and 5). Therefore, the SM interface 618 allows the AGC circuits 400, 500 to be programmed to any frequency, thereby allowing the AGC circuits 400, 500 to be frequency agile.

Latching the frequency and tilt also sets the frequency and tilt in a reference element 620, and the purpose of the reference element 620 will be discussed below. The reset algorithm element 610 triggers a signal type latch 623 to begin an operation that activates a one of three multiplexer 625. Once the multiplexer 625 is active, the digitized video signal, which is stored in the memory circuit 450, 535, is then received. The multiplexer 625 receives the input from the memory circuit 450, 535 and provides the capability of three distinct outputs. One output provides the signal to a fast Fourier transform (FFT) 630 that converts the signal into its spectral components, and the spectrum is then provided to a signal identification 635 that determines if the received spectrum is digital or analog, or if no carrier signal is present. Again, as mentioned above, the analog signal includes dominant peaks that are detected and the signal is then determined to be analog; whereas, the digital signal is essentially a flat signal. After identification, the signal type is stored in the signal type latch 623, which then triggers the look-up table 640 to "look-up" the correct scaling value, whether the signal type is digital or analog, as will be discussed below.

If the signal is determined to be a digital signal, the signal type latch 623 also triggers the multiplexer 625 to provide the signal to the correct algorithm within the DSP 460, 540. For example, if the signal is determined to be digital, the multiplexer 625 provides the demodulated video signal to the root mean square (RMS) algorithm element 645 for averaging. The signal is processed through averaging software that is comparable to the conventional averaging circuits. The output signal of the RMS algorithm element 645 is then routed to a demultiplexer 650. In contrast, if the signal is determined to be analog, the multiplexer 625 provides the signal to the peak algorithm element 655. The analog signal is then processed through software that is similar to the conventional peak detectors included in AGC circuits. More specifically, the peak detector monitors the synchronization pulses of the demodulated video signal and generates a peak voltage signal representative of the peak voltage values. The peak algorithm element 655 then provides the output to the demultiplexer 650.

The output of the demultiplexer 650 is provided to a multiplier 660 that scales the output with the correct value from the look-up table 640. The look-up table 640 stores a predetermined table of values that correspond to digital or analog signals. For example, if the signal is identified as an analog signal, the value will be set at 0 dB, for example, and the signal travels through the multiplier 660 unchanged. On the other hand, if the signal is digital, the value provided by the look-up table 640 may be, for example, 6 dB since the RMS algorithm element 645 performs the averaging below the analog signal. The digital scaling value, such as 6 dB, is multiplied with the digital signal to result in a scaled signal that is substantially equivalent to an analog signal for purposes of performing the steps that follow. It will be appreciated that the look-up table 640 can be altered to scale any signal so that the DSP 460 can operate independent of signal type.

Next, an integrator function 665 compares the received scaled output from the multiplier 660 and the reference value from the reference element 620. The value in the reference element 620 includes the frequency and tilt that was latched from the status monitoring interface 618, the surrounding temperature that is provided by a temperature sensor 470 (FIGS. 4 and 5), and also a temperature coefficient 668. The temperature coefficient 668 is a predetermined value that operates on the value in the reference element 620 to compensate for any system gain changes as a function of the surrounding temperature.

A finite impulse response (FIR) filter 670 then receives the output of the integrator function 670 and further averages the difference amount between the reference circuit 620 and the value of the signal being processed. The FIR filter 670 provides the signal to a scaling block 675 that scales the signal by using a predetermined value that is relative to the requirements of the Bode, which is to be controlled. The control value from the output of the scaling block 675 passively passes through a signal loss detector 680 and an output latch 685 to a digital-to-analog (D/A) converter 475 (FIGS. 4 and 5).

Referring again to FIGS. 4 and 5, the D/A converter 475 converts the signal back to an analog control signal that is then provided to an output 480 coupled to a Bode that is included in electrical devices, such as a cable television amplifier. Again, the Bode is used to control the gain of the amplifier to ensure that the amplifier output remains constant.

Referring back to the block diagram in FIG. 6, the signal identification element 635 will also identify when no signal is present, which is indicative that no pilot signal is present within the network. The signal loss detector 680 detects a loss of pilot signal and sets the signal type latch 623 to an "unknown signal", which requires the multiplexer 625 to continue routing the signal received from the memory 450 to the FFT 630 and the signal identification 635. In addition to an "unknown signal", if the pilot level is too low, then the value destined for the output latch 685 will be very extreme, and may potentially cause an error when controlling the Bode. More specifically, if the pilot level is not present, the integrator function 665 compares a zero pilot level with the reference element 620, which, as a result then compensates to provide a signal equal to the reference element 620. In such cases, instead of trying to compensate for a lost or very low pilot signal, the signal loss detector 680 passes control of the output latch 685 to a thermal control 690. The thermal control 690 then gains control of the Bode. The control levels are then established based on the surrounding temperature, which is provided from the temperature sensor 470 (FIGS. 4 and 5) and a predetermined temperature response programmed in the thermal control 690.

The signal loss indicator 695 can be tied into the status monitoring transponder 465, for example, to send a response to the headend to indicate to the operator that there has been a pilot signal loss within the network. When the pilot signal returns and is identified by the signal identification element 635, the signal is again routed to the signal loss detector 680, where a valid signal is recognized and the output value then changes the control from the thermal control 690 back to algorithms that are performed in the RMS algorithm element 645 and the peak algorithm element 655.

Another feature of the DSP 460, 540 is the status monitoring control. If an operator chooses to change the frequency and tilt of the pilot carrier signal, the new values are programmed into the status monitoring software that is located within the headend. The software notifies all the transponders included within electrical devices, such as transponders 465. The transponders 465 then route the change of information to the SM interface 618. The frequency and tilt are changed in the latch 615, which then provides the new frequency to the LO synthesizer 450, 515 (FIGS. 4 and 5). For 35 example, referring to FIG. 4, if the IF filter 420 is a 44 MHz filter and the frequency of the pilot carrier changes from 445.25 MHz to 547.25 MHz, the LO synthesizer 450 is changed from 489.25 MHz to 591.25 MHz. The new LO synthesizer 450 value of 591.25 MHz is then mixed through mixer 410 with the wideband frequencies that pass through filter 405. The output of the mixer 410 is then filtered through the 44 MHz filter, which provides a signal indicative of the new pilot carrier signal.

In summary, the frequency agile AGC circuits 400, 500 allow for greater flexibility in the design and upgrade of communication systems. It allows the frequency of the pilot carrier signal to reside in either the analog or digital domain. In addition, the frequency of the pilot carrier signal can be changed remotely without having to physically change out each AGC.

What is claimed is:

1. An automatic gain control (AGC) circuit, comprising:
    an input port for receiving an input signal that is one of a digital input signal and an analog input signal, wherein the input signal at times includes a pilot carrier signal;
    a circuit coupled to the input port for recovering from the input signal a demodulated video signal;
    a signal processor coupled to the circuit for providing an adjustment value based upon the demodulated video signal, wherein the signal processor determines which of the digital input signal and the analog input signal has been received by transforming the demodulated video signal into the frequency domain, and wherein, when the input signal is determined to be digital, the signal processor averages the demodulated video signal to generate the adjustment value, and, when the input signal is determined to be analog, the signal processor detects a peak of the demodulated video signal to generate the adjustment value; and
    an output port coupled to the signal processor for providing the adjustment value.

2. The AGC circuit of claim 1, wherein the signal processor further comprises:
    a signal identification circuit for identifying which of the digital input signal and the analog input signal has been received, and for providing a signal identification; and
    a signal type latch coupled to the signal identification circuit, wherein the signal identification is provided to the signal type latch by correlating the frequency domain of the demodulated video signal with a digital signal identification and an analog signal identification.

3. The AGC circuit of claim 1, further comprising:
    an oscillator for receiving a reference pilot carrier signal, and for providing the reference pilot carrier signal to a mixer to isolate the pilot carrier signal to be equal to the reference pilot carrier signal.

4. The AGC circuit of claim 3, wherein the signal processor further comprises an interface for receiving the reference pilot carrier signal, and for providing the reference pilot carrier signal to the oscillator.

5. The AGC circuit of claim 1, further comprising:
    a converter for converting the demodulated video signal to a digital signal, wherein the digital signal is provided to the signal processor.

6. The AGC circuit of claim 1, wherein the signal processor further comprises:
    a signal loss detector for detecting when the input signal does not include the pilot carrier signal, and for providing a thermal control when the input signal does not include the pilot carrier signal; and
    a thermal control circuit coupled to the signal loss detector for providing thermal control to a Bode circuit when the input signal does not include the pilot carrier signal.

7. The AGC circuit of claim 1, the AGC circuit further comprising frequency adjustment means for determining whether a frequency of the pilot carrier signal has changed, and for compensating for any change in the frequency.

8. The AGC circuit of claim 7, wherein the frequency adjustment means comprises:
    a local oscillator for providing a dynamic frequency value that varies with the frequency of the pilot carrier signal; and
    a mixer coupled to the local oscillator and the input port for mixing the frequency of the pilot carrier signal to result in a video signal, which is subsequently demodulated.

9. An amplifier having automatic gain control (AGC), the amplifier comprising:
    at least one gain stage for amplifying a signal received by the amplifier, the gain stage comprising an input terminal and an output terminal;
    an AGC circuit for controlling attenuation of the signal in the gain stage, wherein an input of the AGC circuit is coupled to the output terminal of the gain stage for receiving a pilot signal and an output of the AGC circuit is coupled to the input terminal of the gain stage for providing a level control thereto, the AGC circuit comprising:

an input port for receiving the pilot signal that is one of a digital pilot signal and an analog pilot signal;

a circuit coupled to the input port for recovering from the pilot signal a demodulated video pilot signal;

a signal processor coupled to the circuit for providing an adjustment value based upon the demodulated video pilot signal, wherein the signal processor determines which of the digital pilot signal and the analog pilot signal has been received by transforming the demodulated video pilot signal into the frequency domain, and wherein, when the pilot signal is determined to be digital, the signal processor averages the demodulated video pilot signal to generate the adjustment value, and, when the pilot signal is determined to be analog, the signal processor detects a peak of the demodulated video pilot signal to generate the adjustment value; and an output port for providing the adjustment value at the input terminal of the gain stage.

10. The amplifier of claim 9, wherein the signal processor further comprises:

a signal identification circuit for identifying which of the digital pilot signal and the analog pilot signal has been received, and for providing a signal identification; and a signal type latch coupled to the signal identification circuit, wherein the signal identification is provided to the signal type latch by correlating the frequency domain of the demodulated video pilot signal with a digital identification signal and an analog identification signal.

11. The amplifier of claim 9, wherein the signal processor further comprises a status monitor interface for receiving a reference pilot carrier signal.

12. The amplifier of claim 11, the AGC circuit further comprising frequency adjustment means coupled to the status monitor interface for determining whether a frequency of the reference pilot carrier signal has changed, and for compensating for any change in the frequency.

13. The amplifier of claim 12, wherein the frequency adjustment means comprises:

a local oscillator for providing a dynamic frequency value that varies with the frequency of the pilot carrier signal; and a mixer coupled to the local oscillator and the input port for mixing the frequency of the reference pilot carrier signal with the signal to result in a video pilot signal, which is subsequently demodulated.

14. A communication system for providing information, the communication system comprising:

a transmitter for transmitting a signal including the information;

a receiver for receiving the signal; and an amplifier coupled between the transmitter and the receiver for amplifying the signal, the amplifier comprising:

a gain stage for amplifying the signal received by the amplifier; and an automatic gain control (AGC) circuit for controlling the attenuation of the signal in the gain stage, the AGC circuit comprising:

an input port for receiving an input signal that is one of a digital input signal and an analog input signal, wherein the input signal includes a pilot carrier signal;

a circuit coupled to the input port for recovering from the input signal a demodulated video signal;

a signal processor coupled to the circuit for providing an adjustment value based upon the demodulated video signal, wherein the signal processor determines which of the digital input signal and the analog input signal has been received by transforming the demodulated video signal into the frequency domain, and wherein, when the input signal is determined to be digital, the signal processor averages the demodulated video signal to generate the adjustment value, and, when the input signal is determined to be analog, the signal processor detects a peak of the demodulated video signal to generate the adjustment value;

a status monitor interface for receiving a reference pilot carrier signal;

frequency adjustment means coupled to the status monitor interface for determining whether a frequency of the reference pilot carrier signal has changed, and for compensating for any change in the frequency; and an output port coupled to the signal processor for providing the adjustment value.

15. The communication system of claim 14, wherein the signal processor further comprises:

a signal identification circuit for identifying which of the digital input signal and the analog signal has been received, and for providing a signal identification; and a signal type latch coupled to the signal identification circuit, wherein the signal identification is provided to the signal type latch by correlating the frequency domain of the demodulated video signal with a digital signal identification and an analog signal identification.

16. The communication system of claim 14, further comprising:

a local oscillator for providing a dynamic frequency value; and a mixer coupled to the local oscillator and the input port for mixing the frequency of the reference pilot carrier signal with the input signal to result in a video pilot signal, which is subsequently demodulated.

* * * * *

UNITED STATES PATENT AND TRADEMARK OFFICE
CERTIFICATE OF CORRECTION

PATENT NO.    : 6,567,118 B1
DATED         : May 20, 2003
INVENTOR(S)   : Al-Araji et al.

It is certified that error appears in the above-identified patent and that said Letters Patent is hereby corrected as shown below:

Column 7,
Line 41, delete "35" between "For" and "example,"

Signed and Sealed this

Twentieth Day of January, 2004

JON W. DUDAS
*Acting Director of the United States Patent and Trademark Office*